Feb. 23, 1954          J. B. DES ROSIERS          2,670,246
                EMERGENCY WHEEL FOR PNEUMATIC TIRES
Filed April 19, 1949                          2 Sheets-Sheet 1
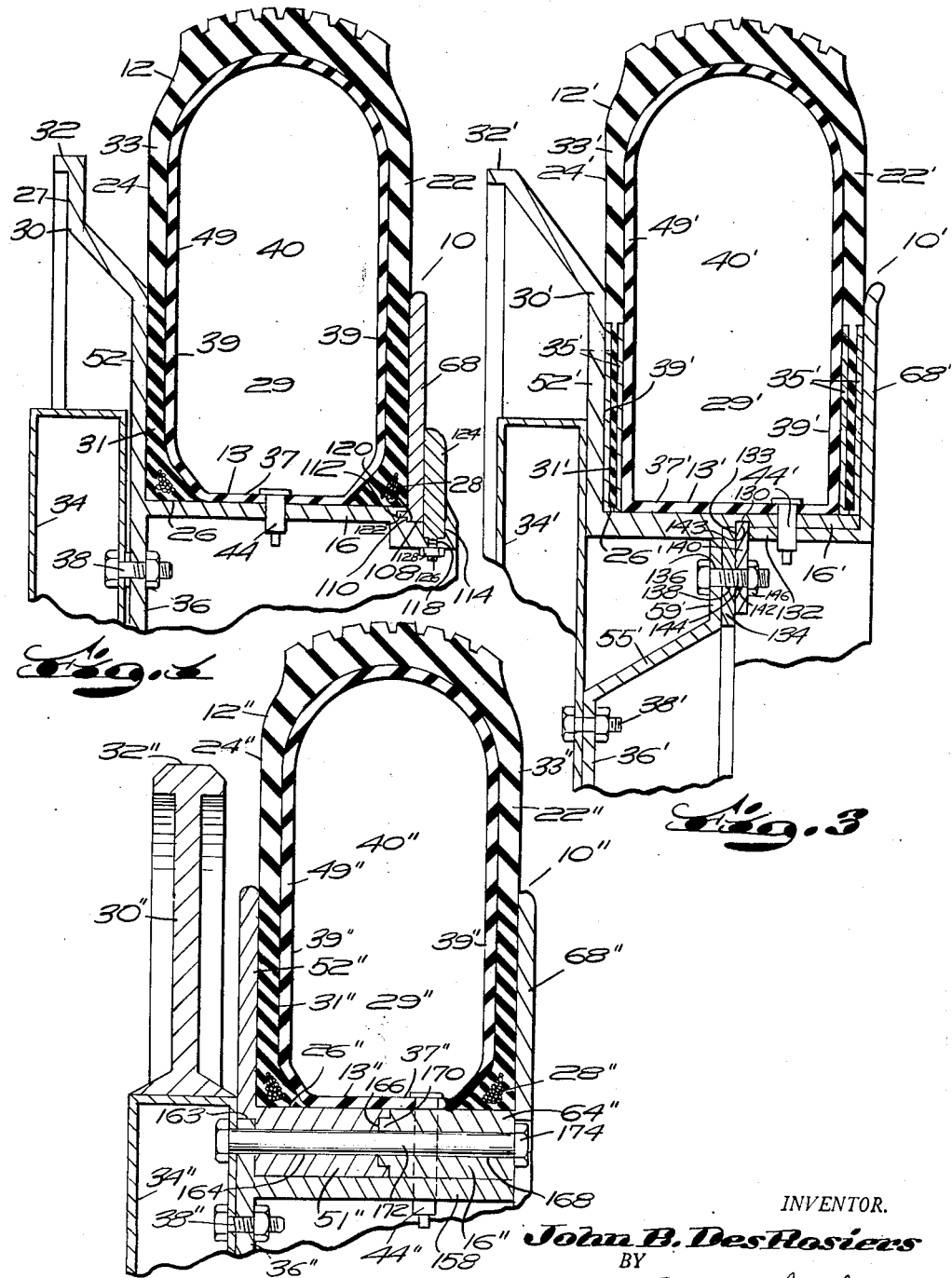

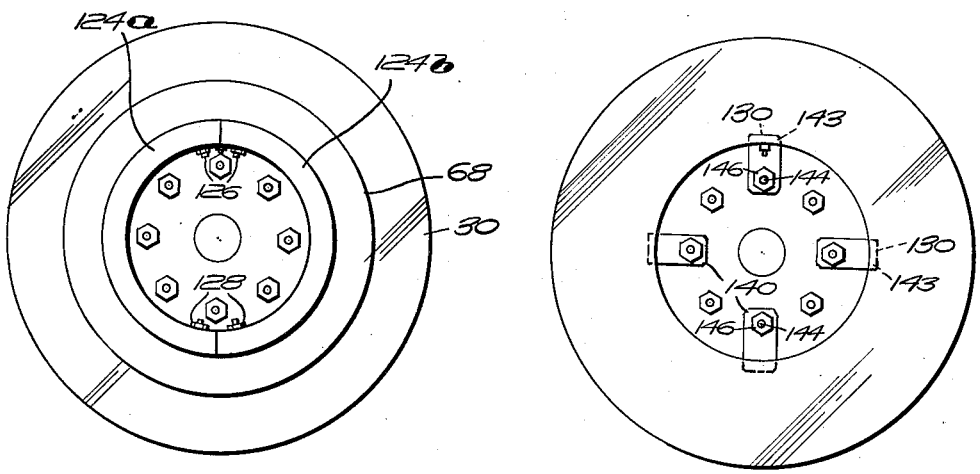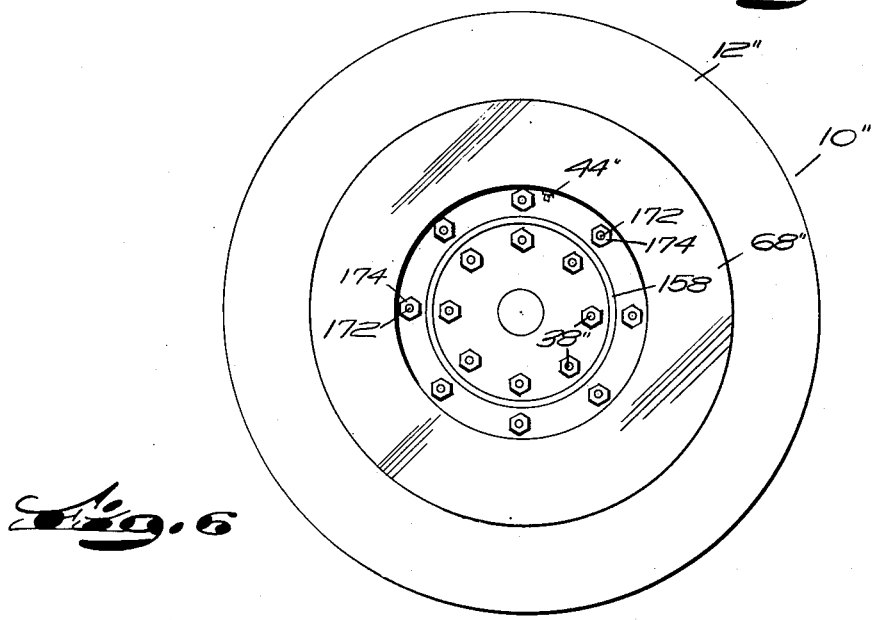

Patented Feb. 23, 1954

2,670,246

UNITED STATES PATENT OFFICE 2,670,246

EMERGENCY WHEEL FOR PNEUMATIC TIRES

John B. Des Rosiers, Providence, R. I.

Application April 19, 1949, Serial No. 88,425

2 Claims. (Cl. 301—39)

My invention relates to improvements in pneumatic tires and comprises a pneumatic tire of a width equal to present day balloon or so-called cushion tires presenting a large area of contact on the road and comprises the provision of a tire which is preferably at least substantially twice as deep as ordinary tires and adapted to be used on a rim of much smaller radius than present day types of tires.

I am aware that others have attempted to increase the volumetric size of the tire by providing a groove in a rim of standard radius and permitting a portion of the tube to descend within the groove. I believe I am the first, however, to provide a tire wherein the whole shoe is made of a size not only to fill a groove in the usual sized rim, but also to extend downwardly into the wheel substantially the depth of an ordinary tire, thereby with the tire also extending its usual height above the rim at least doubling the amount of air in the tire to add to the cushioning qualities thereof.

Due to the greater volume provided by my tire, a larger deformation of the tire when striking a bump or abutment is required to produce a given change of pressure than would be the case with standard short depth tires which means that a given bump on the road will apply a smaller jolt to the car occupants, and due to the fact that a much greater amount of air is present, the tire will be much cooler, due to the fact that the flows of pressure caused by the bump will be distributed throughout a great volume and the friction of the air particles against each other correspondingly lessened thereby, providing much cooler running qualities to the tire in use, preventing any excessive amount of heat to cause deterioration of the tire.

I also suitably modify the rim structure so as to provide a rim of much less radius than usual, but I preferably provide inner and outer flanges up to substantially the height of a standard type of rim to abut the lower portions of the walls of my improved tire substantially up to the height of the standard rim and thereby provide a structure which will positively not pull out.

In accordance with my invention, I provide a pneumatic tire generally oblong in section and having an inner chamber portion for containing the air, having a height substantially of at least twice its width and having a substantially flat lower end and substantially flat side walls, so that the lower rectangular portion of the tire will be maintained in position between the small rim and the inner and outer relatively high tire wall abutting flanges, each preferably of substantially half the height of the tire, providing a structure from which it is almost impossible to remove the tire, so that on a blow-out the tire positively will not come out of position and be ripped to pieces by further operation of the vehicle.

Further advantages of my invention are the saving of wear on the car, due to the extra cushioning features provided by my tire, the tire at the same time giving a more comfortable ride, and reducing the amount of heat produced in the operation thereof, thus largely eliminating any premature deterioration of the tire, due to the excessive heat created as in present types of tires.

A further object of my invention is to provide a solid emergency wheel having a supporting rim of a radius slightly less than the radius of the main tire mounting wheel, having my improved tire mounted thereon, mounted on said axle, so that should a blow-out or puncture occur in my tire, the vehicle will be supported by the solid emergency wheel, thereby eliminating many of the dangers present with present day tires, resulting from punctures or blow-outs, and enabling the driver of a vehicle equipped with my invention to drive to the nearest garage with a flat tire without injurious effects on the flat tire and tube, which emergency rim also facilitates the jacking of the wheel and the changing of the tires.

Further features of my invention relate to the particular structure of the tire employed and the modifications in the wheel and rim necessary to mount my improved tire thereon, all of which provide a construction which is simple and inexpensive to manufacture and one which may be readily and quickly mounted and dismounted in use.

These and such other objects of my invention as may hereinafter appear will be best understood from a description of the accompanying drawings.

In the drawings, Fig. 1 is a vertical sectional view through a tire and adjacent upper portion of a vehicle wheel constructed in accordance with one embodiment of my invention.

Fig. 2 is a side elevation looking at the outside of a wheel equipped with the embodiment of my invention shown in Fig. 1.

Fig. 3 is a vertical sectional view through a tire and adjacent upper portion of a vehicle wheel constructed in accordance with a different embodiment of my invention.

Fig. 4 is a side elevation looking at the outside of a wheel equipped with the embodiment of my invention shown in Fig. 3.

Fig. 5 is a vertical sectional view through a tire and adjacent upper portion of a vehicle wheel constructed in accordance with a different embodiment of my invention.

Fig. 6 is a side elevation looking at the outside of a wheel equipped with the embodiment of my invention shown in Fig. 5.

In the drawings, wherein like characters of reference generally indicate like parts throughout, 10, 10' and 10" generally indicate embodiments of vehicle wheels constructed in accordance with my invention.

As stated hitherto, my invention essentially comprises a novel type of pneumatic tire 12, 12', 12" generally oblong in section having an inner chamber portion 40, 40', 40", having a height of substantially twice its width, having a substantially flat lower end 13, 13', 13" and substantially flat side walls 24, 24', 24". The tire side walls 24, 24', 24" terminate in the flat lower ends 26, 26', 26" abutting the tire rim 16, 16', 16". As stated hitherto, the rim 16, 16', 16" is of much smaller radius than the usual tire rim, by substantially the normal height of a normal tire, so that a tire of a standard width may be mounted thereon and still have twice the height or depth of a tire of a standard width.

I preferably so modify the rim 16, 16', 16" and wheel 10, 10', 10" as to provide an inner annular flange 52, 52', 52" projecting upwardly from the inner end of said rim of substantially half the height of the tire abutting the inner wall thereof and an outer annular flange 68, 68', 68" projecting upwardly from the outer end of said rim 16, 16', 16" detachably securable to said rim abutting the outer tire wall and also substantially half the height of said tire, said flanges providing with said rim, a groove for clamping the inner half of the tire therein, with the upper ends of said flanges extending at a radius from the center of the wheel substantially that of the usual rim and in effect providing a central groove 29, 29', 29" in the rim, having flat side walls extending downwardly a depth equal to the normal height of the tire above the standard rim. If desired, the rim 16" may be split into an inner rim portion 51" and into a rim outer portion 64", such as in the embodiment shown in Figs. 5 and 6.

My improved tire 12, 12', 12", therefore, comprises an oblong annular casing or shoe 22, 22', 22" having the flat side walls 24, 24', 24" terminating in flat rim abutting lower ends 26, 26', 26". Said lower ends 26, 26', 26" may have a standard type of strengthening metal wire bead 28, 28" incorporated therein. The lower portions 31, 31', 31" of the side wall of the tire may be made of more rigid material than the upper portions 33, 33', 33" or they may, if desired, have reinforcing strengthening metal plates 35' secured to the inner and/or outer surfaces of the lower portions 31' of the tire wall as shown in the embodiment shown in Figs. 3 and 4 in any suitable manner as by vulcanizing them thereto, or suitably riveting or otherwise securing them thereto.

The tires may be provided with suitable valves, 44, 44', 44" in the embodiments shown provided for this purpose in the suitably shaped inner tubes 49, 49', 49", shaped of the same general shape as the casings 22, 22', 22" to fit the chambers 40, 40', 40" thereof.

In all embodiments of my invention shown I have provided an emergency solid wheel 30, 30', 30", having the supporting rim 32, 32', 32" of a radius slightly less than the radius of said tire mounting wheel and tire, mounted on said axle in any suitable manner, preferably extending radially outwardly from the brake drum 34, 34', 34" to provide an emergency support for the vehicle in case of the collapse of the tire due to a puncture, blow-out or other loss of air, so that should said blow-out occur while driving, the vehicle will be immediately supported by the emergency wheel to prevent it from coming out of control of the driver, to cause accidents or to permit it to be jacked up or run to the nearest garage for changing the tire.

As stated, the upper portion 33, 33', 33" of my improved tire is flexible so that in case of a blow-out or puncture, said flexible portion will immediately collapse to a position below the height of the emergency rim 32, 32', 32", so as not to injure my improved tire while the vehicle is being towed or driven to the nearest garage after a blow-out in use.

Due to the depth of the groove 29, 29', 29" provided by my improved inner and outer flanges 52, 52', 52" and 68, 68', 68", it is obvious that I have provided a construction which positively will not be pulled out of its position in its groove 29, 29', 29" by traffic after a blow-out and will decrease also the danger of having the tire "roll off" on turning a corner at excessive speeds.

In the embodiment shown in Figs. 1 and 2, said emergency wheel is provided by continuing the inner flange 52 first inwardly and upwardly, and then upwardly and terminating in the flat end 32 to provide the emergency supporting wheel.

In the embodiment shown in Figs. 3 and 4, said inner flange is continued inwardly and upwardly as at 36' to terminate in the flat end or rim 32'.

I have provided, however, in the embodiment shown in Figs. 5 and 6 a construction which I believe is entirely novel, namely, the annular flange 30" projecting upwardly from the outside of the outer wall of the brake drum 34" to terminate in a flat end or rim 32".

It is quite obvious that this extra expense of metal adjacent the tire tends to conduct heat away from and dissipate it without injuriously affecting the rubber in the tire. It also conducts the heat from the brake drum and dissipates it, instead of its being conducted from or through the brake drum and rim to the tire itself.

I will now describe in detail the specific structure of the various embodiments shown, including the modifications of standard types of vehicle wheels and rims necessary for this purpose, although it is obvious that these specific constructions are merely illustrative of typical constructions employing the principles of my invention.

In the embodiment of my invention shown in Fig. 1, the vehicle wheel comprises a brake drum 34, an inner annular flange 36 connected to the brake drum in any suitable manner, such as in the embodiment shown by the bolts 38, having the flat annular rim providing portion 16 projecting laterally therefrom, having a down-set portion 108 at the outer end thereof, providing an annular shoulder 110 having an annular socket 112 therein, said down-set portion having an annular groove 114 therein beyond said shoulder, having spaced pairs of holes 118 therein diametrically thereof, said annular flange projecting upwardly a substantial distance to provide the inner tire wall abutting flange 52, then obliquely inwardly and upwardly as at 36, then upwardly as at 27, terminating in the flat end 32 providing a supporting rim providing an emergency solid wheel. I provide the pneumatic tire 12, oblong in section, having the flat side walls 24 terminating in the flat ends 26 abutting said rim and an inner chamber portion 40 having a height of at least twice its width and having a substantially flat inner end 37 and substantially flat side walls 39, with said inner tire wall 26 abutting said inner flange 52 substantially throughout half the height thereof.

To detachably secure the tire to the rim, I provide the outer annular flange 68 also substantially of half the height of the tire abutting the outer wall of the tire and having the lower end 120 abutting the shoulder 110 formed by the outer inset portion 103 of said rim and having the annular inwardly projecting rim 122 contained within the annular groove 112 thereof and a locking ring plate 124 comprising two annular sections 124a and 124b contained within said groove 114, having an inner surface abutting the outer surface of said detachable outer flange 68 and pairs of diametric threaded bolt extensions 126 projecting downwardly through the diametric pairs of holes 118 in said annular groove 114 in the outer down-set portion of said rim 108 and the nuts 128 threaded on the lower ends thereof abutting the lower surface of said downset portion 108 of said rim to clamp the sections 124a and 124b of said locking ring 124 in position, with its inner surface abutting said outer flange 68 to cause it to clamp against the outer wall 26 of said tire to clamp said tire 12 against said inner flange 52 in the channel 29 formed by said flanges.

In the embodiment of my invention shown in Figs. 3 and 4, the vehicle wheel 10' comprises the brake drum 34', a wheel disc or web 36', having an annular lower end detachably securable to said brake drum 34' by the bolts 38', a center portion 55' projecting outwardly and upwardly therefrom, an upper portion 59' projecting upwardly therefrom and a flat annular rim providing portion 16' mounted centrally of said upper portion, having radial slots 130 extending upwardly partially therethrough at circumferentially spaced distances thereof (90° as shown), an inner annular tire abutting flange 52' projecting upwardly from the inner end thereof a substantial distance substantially half the height of the tire, then obliquely inwardly as at 30' terminating in the flat end 32', providing a supporting rim, providing an emergency solid wheel. I provide also the pneumatic tire 12' oblong in section, having substantially flat side walls 24' terminating in flat ends 26' abutting said rim 16' and having an inner chamber portion 40' having a height substantially of at least twice its width and having a substantially flat lower end 37' and susbtantially flat side walls 39', with said inner tire wall 26' abutting said inner flange 52' substantially throughout half its height, and an outer detachable flange portion 68' of susbtantially half the height of the tire abutting the outer wall 26' of said tire and a portion 132 extending in annular formation inwardly thereof to the outer upper portion 59' of the disc flange 36' having circumferential spaced radial slots 133 extending upwardly therethrough below said slots 130 and a portion 134 extending downwardly to abut the upper portion 59' of said disc flange, said upper portion of said disc flange 59' and said inner flange portion 134 of said outer flange having aligned bolt holes 136 and 138 therein.

I provide the locking plates 140 also having the bolt holes 142 therein aligned with said bolt holes 136 and 138, having the upper ends 143 thereof inserted through said circumferentially spaced slots 133 within said aligned circumferentially spaced slots 130 at circumferentially spaced intervals throughout the wheel, four as shown in Fig. 4, bolts 144 extending through said aligned bolt holes 136, 138 and 142 and nuts 146 clamping the free ends of said bolts against a respective plate 140 and said abutting outer flange lower portion 134 and said disc flange upper portion 59', causing said outer flange portion 68' to clamp against the outer wall of said tire to clamp said tire against said inner flange 52' in the channel 29' formed by said flanges. In this embodiment, the lower half portions of the tire side walls 26 are reinforced by having the flat metallic supporting plates 35' secured to the inner and outer surfaces thereof, if desired, it also being obvious that, if desired, one of these supporting plates may be omitted.

In the embodiment of my invention shown in Figs. 5 and 6, my invention comprises the vehicle wheel 10", comprising the brake drum 34" having an annular flange 30" projecting upwardly therefrom, terminating in the flat end 32" providing the supporting rim, providing an emergency solid wheel.

I also provide an annular flange 36" projecting upwardly from the hub, having an inner wall secured to the outer wall of said brake drum 34" in any suitable manner, such as by the bolts 38", and having a flange 158 projecting laterally outwardly therefrom the desired width of the tire, providing a rim supporting flange. This embodiment of my invention includes a split rim and for this purpose I provide an inner rim section 51" of substantially half the width of the rim 16", having an inner flange 52" projecting upwardly from the inner end thereof and a cutaway portion 163 in alignment therewith for receiving the upper end of said hub flange 36".

I also provide circumferentially spaced transverse holes 164 in said rim 51", eight, as shown, each having a central cylindrical socket 166 extending laterally inwardly around said holes from the outer edges thereof.

I also provide an outer rim portion 64" also having similarly circumferentially spaced transverse holes 168, of a width substantially half the rim, having a central cylindrical projection 170 therein extending inwardly therefrom around each hole, providing male projections 170 fitting within the sockets 166 of the inner rim portion 51" and an outer annular flange 68" projecting upwardly from the outer end thereof to abut the outer wall of the tire of substantially the height of said inner flange.

I also provide a pneumatic tire 12" oblong in section and having substantially flat side walls 24" terminating in flat ends 26" abutting said rim 16" and having an inner chamber portion 29" of a height substantially of at least twice its width and having the flat lower end 37" and substantially flat side walls 39" abutting said inner and outer flanges 52" and 68" and the bolts 172 extending outwardly through said aligned circumferentially spaced transverse holes 164 and 168 in said rim portions 51" and 64" to secure said rim portions together and to said disc hub flange 36" and brake drum side wall and nuts 174 secured to the threaded outer ends of said bolts abutting the outer ends of said outer rim portion 64".

It is obvious that any of these tires with the constructions described may be readily, quickly and easily detached by merely loosening the bolts and removing the outer split rim portions in the embodiment shown in Figs. 3–6, or the respective flange 68 and locking ring 124 in the embodiment shown in Figs. 1 and 2, and that a tire may be readily mounted therein in a reverse manner.

It is apparent that I have provided a novel type of cushion tire with the advantages described above.

I employ the terms inner and outer in referring to the wheel, with inner signifying the portion adjacent the vehicle and outer signifying the portion away from the vehicle.

I employ the word upper and lower, upwardly and downwardly, etc., relative to the radial position of the parts of the tire, upper signifying at a greater radial distance, and lower signifying at a less radial distance in accordance with common automobile parlance, instead of their more cumbersome, more accurate terms and despite the fact that the relative positions change on revolution of the tire, which, however, due to the fact that all parts of the tire are similar, makes no difference.

It is apparent that I have provided a novel type of tire and wheel construction with the advantages described above.

It is understood that my invention is not limited to the specific embodiments shown and that various deviations may be made therefrom without departing from the spirit and scope of the appended claims.

What I claim is:

1. A vehicle wheel, comprising a brake drum, an inner annular flange mounted on the side wall of said brake drum, having a flat annular rim providing portion projecting laterally therefrom, having a down-set portion at the outer end thereof providing an annular shoulder and having an annular groove therein beyond said shoulder having pairs of holes therein diametrically thereof, said inner annular flange projecting upwardly a substantial distance, then obliquely inwardly and upwardly and terminating in a flat end providing a supporting rim, providing an emergency solid wheel, a pneumatic tire oblong in section and having substantially flat side walls terminating in flat ends abutting said rim and having an inner chamber portion having a height substantially of at least twice its width and having a substantially flat lower end and substantially flat side walls with said inner wall abutting said inner flange substantially throughout half its height and an outer annular flange also substantially half the height of said tire abutting the outer wall of said tire and having an end abutting the shoulder on the outer inset portion of said rim and a locking ring plate comprising two hemi-annular sections contained within said groove having an inner surface abutting the outer surface of said detachable flange and threaded bolt extensions projecting downwardly through the diametric pairs of holes in said annular groove in the outer down-set portion of said rim and nuts threaded on the lower ends thereof abutting the lower surface of the down-set portion of said rim to clamp the sections of said locking ring in position with its inner surface abutting said outer flange to cause it to clamp against the outer wall of said tire to clamp said tire against said inner flange in the channel formed by the said flanges.

2. A vehicle wheel, comprising a brake drum, an inner annular flange mounted on the side wall of said brake drum, having a flat annular rim providing portion projecting laterally therefrom, having a down-set portion at the outer end thereof providing an annular shoulder and having an annular groove therein beyond said shoulder having pairs of holes therein diametrically thereof, said inner annular flange projecting outwardly a substantial distance, a pneumatic tire oblong in section and having substantially flat side walls terminating in flat ends abutting said rim and having an inner chamber portion having a height substantially of at least twice its width and having a substantially flat lower end and substantially flat side walls with said inner wall abutting said inner flange substantially throughout half its height and an outer annular flange also substantially half the height of said tire abutting the outer wall of said tire and having an end abutting the shoulder on the outer inset portion of said rim and a locking ring plate comprising two hemi-annular sections contained within said groove having an inner surface abutting the outer surface of said detachable flange and threaded bolt extensions projecting downwardly through the diametric pairs of holes in said annular groove in the outer down-set portion of said rim and nuts threaded on the lower ends thereof abutting the lower surfaces of the down-set portion of said rim to clamp the sections of said locking ring in position with its inner surface abutting said outer flange to cause it to clamp against the outer wall of said tire to clamp said tire against said inner flange in the channel formed by the said flanges.

JOHN B. DES ROSIERS.

References Cited in the file of this patent

UNITED STATES PATENTS

| Number | Name | Date |
|---|---|---|
| 1,435,566 | Vanderley | Nov. 14, 1922 |
| 1,481,488 | Tobin | Jan. 22, 1924 |
| 1,574,277 | Conroy | Feb. 23, 1926 |
| 1,712,322 | Bachrach | May 7, 1929 |
| 1,736,130 | Cloud | Nov. 19, 1929 |
| 2,234,838 | Briskman | Mar. 11, 1941 |

FOREIGN PATENTS

| Number | Country | Date |
|---|---|---|
| 528,300 | France | Nov. 9, 1921 |